United States Patent [19]

Akao et al.

[11] 4,359,499
[45] Nov. 16, 1982

[54] PACKAGING MATERIAL FOR PHOTOSENSITIVE MATERIALS

[75] Inventors: Mutsuo Akao; Kenzo Kashiwagi, both of Minami-ashigara, Japan

[73] Assignee: Fuji Photo Film Co., Ltd., Kanagawa, Japan

[21] Appl. No.: 235,229

[22] Filed: Feb. 17, 1981

[30] Foreign Application Priority Data

Feb. 15, 1980 [JP] Japan .................................. 55-18088

[51] Int. Cl.³ ...................... B32B 27/00; B32B 27/16
[52] U.S. Cl. .................................... 428/201; 206/455;
428/195; 428/206; 428/207; 428/211; 428/212;
428/224; 428/332; 428/461; 428/481; 428/483;
428/500; 428/511; 428/515; 428/910
[58] Field of Search ............... 428/201, 206, 211, 209,
428/212, 910, 332, 913, 340, 341, 245, 290, 461,
467, 481, 507, 483, 224, 207, 225, 458, 515, 500,
511; 206/455, 524.1, 634; 229/53, 55

[56] References Cited

U.S. PATENT DOCUMENTS

| | | | |
|---|---|---|---|
| 3,496,059 | 2/1970 | Rasmussen | 428/201 |
| 3,672,952 | 6/1972 | Brown et al. | 428/201 |
| 4,147,291 | 4/1979 | Akao et al. | 428/910 |
| 4,228,215 | 10/1980 | Hein | 428/910 |

FOREIGN PATENT DOCUMENTS 2026942 2/1980 United Kingdom ............... 428/910

Primary Examiner—Paul J. Thibodeau
Attorney, Agent, or Firm—Sughrue, Mion, Zinn, Macpeak & Seas

[57] ABSTRACT

A packaging material for photosensitive materials is disclosed consisting of a uniaxially oriented thermoplastic film having formed thereon at least one flexible layer, which is not uniaxially oriented, having a tear strength less than that of the film in the direction perpendicular to the axis of orientation of the film.

15 Claims, 4 Drawing Figures

PACKAGING MATERIAL FOR PHOTOSENSITIVE MATERIALS

BACKGROUND OF THE INVENTION

This invention relates to a packaging material for photosensitive materials, such as photographic material, food stuffs, etc., and more particularly to a packaging material for photosensitive materials which has high physical strength, can be manufactured at low cost, and from which an easy opening bag can be made.

Photosensitive materials such as photographic film or paper are vulnerable to light, so they must be wrapped with a packaging material that provides a complete shield from light. If the packaging material is used as a bag, it must have sufficient physical strength (i.e., tensile strength and tear strength) for the specific size and weight of the material to be packed. The opening of the bag containing the photosensitive material is heat-sealed to make the bag completely lightproof and moisture-proof. For this purpose, the packaging material is required to have good heat-sealability and heat seal strength. It is also required that the heat sealed bag be easily torn open and provide a straight tear line.

The configuration of the bag for packaging photosensitive materials can vary to some extent depending upon the use, but it is in most cases a bag having sides which are heat sealed completely. A known structure of a packaging material for making such a bag is schematically represented in accompanying FIG. 1, wherein a lightproof low density polyethylene film 1 having carbon black or pigment incorporated therein is laminated with a flexible layer 2, such as of paper, aluminium foil, or cellophane by means of an adhesive layer 3. However, such conventional packaging material comprising undrawn low density polyethylene film 1 does not necessarily have high physical strength and moisture resistance, and to provide these properties, the thickness of the film 1 must be increased. Furthermore, the lightproof material such as carbon black or pigment incorporated in the film 1 has a tendency to decrease the physical strength of the film, and so, to provide an acceptable lightproof packaging material it is necessary to further increase the thickness of the film 1. However, making a bag of the thicker packaging material has the following disadvantages:

(1) the bag is difficult to tear open by hand, and even if a notch is provided to facilitate opening, the bag may tear in an unpredictable direction;

(2) the increase in the film thickness results in a corresponding increase in the manufacturing cost of the packaging material; and (3) a lamination made of a thick film and paper or the like is easily affected by shrinkage of the film, and the resultant curling makes it difficult to make a bag of such packaging material.

A uniaxially-oriented film has extremely small tear strength in the direction of the axis of orientation and can be torn rectilineally, but taking it the other way round, this oriented film is very easy to tear when an article having protuberances is packed therein, and a hole or a tear are often made. In order to avoid these disadvantages, packaging materials comprising at least two uniaxially oriented films, which are bonded with an adhesive layer so that oriented axes of the films cross each other at an angle of 45° to 90° have conventionally been used. However, the materials as described above have such disadvantages that the increase in the film thickness results in a corresponding increase in the manufacturing cost of the packaging material, and the bag may tear in an unpredictable direction to give a notched opening part.

SUMMARY OF THE INVENTION

The primary purpose of this invention is to provide a packaging material for photosensitive materials that has high physical strength (even if it is thin), which can be manufactured at low cost, and from which an easy-opening bag can conveniently be made.

Such object of this invention can be achieved by a packaging material for photosensitive materials which consists of a uniaxially-oriented thermoplastic film having formed thereon at least one flexible layer, which is not uniaxially-oriented, having a tear strength smaller than that of the film in the direction perpendicular to the axis of orientation.

The object and advantages of this invention will be more apparent by reference to the following description and accompanying drawings.

BRIEF DESCRIPTION OF THE ACCOMPANYING DRAWINGS

FIG. 1 shows in cross-section the arrangement of layers in the conventional packaging material for photosensitive materials; and FIGS. 2 to 4 show in cross-section three embodiments of the arrangement of layers in the packaging material of this invention.

DETAILED DESCRIPTION OF THE INVENTION

Figure 2:
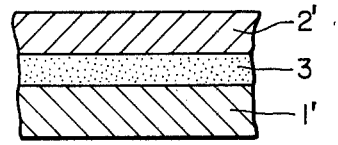

FIG. 2 shows in cross-section the arrangement of layers in a packaging material according to one preferred embodiment of this invention. In the figure, 1' is a high density oriented polyethylene film (the oriented axis direction of the film crosses with the longitudinal direction thereof at angle of 45°) 45μ thick, which contains 4.5 wt% of carbon black; 2' is a paper layer 35μ thick, and at a weight of 30 g per square meter for use as a flexible layer; 3 is a low density polyethylene adhesive layer 15μ thick having a water content of less than 0.03 wt%. The "high density oriented polyethylene film" refers to a polyethylene film wherein polyethylene molecules composing the film are oriented in a certain direction, and specifically to a polyethylene film prepared by uniaxially drawn at a drawing rate of about 3.5 times. The high density oriented polyethylene film used for this invention had a density of about 0.96 g/cm$^3$, a tear strength in the axis direction of orientation of about 50 g and a tear strength in the direction perpendicular to axis of orientation of about 200 g. The "flexible layer" used for this invention had a tear strength in longitudinal direction of about 53 g and a tear strength in lateral direction of about 70 g. The paper 2' has a tear strength smaller than that of the oriented film 1' in the direction perpendicular to the axis of orientation of the film.

Therefore, the packaging material of this embodiment is a lamination of three layers, and it is prepared by forming the low density polyethylene adhesive layer 3 on the oriented film 1' and laminating the adhesive layer with paper 2'. A known laminating apparatus may be used to produce the packaging material of this invention. A bag is made of the packaging material in such a manner that the axis of orientation of the film 1' is in agreement with the direction in which the bag is intended to be torn open.

This invention is now described in greater detail by reference to the following examples which are given here for illustrative purposes only and are not intended to limit the scope of the invention.

EXAMPLE 1

Figure 1:
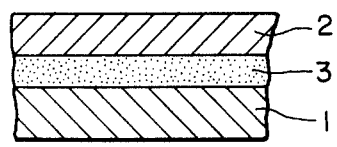

A bag was made of the packaging material of this invention, and the various characteristics (indicated in Table 1 below) of the packaging material and the bag were compared with those of a conventional packaging material and a bag made of such material. The arrangement of the layers in the conventional packaging material is shown schematically in FIG. 1, wherein 1 is a low density polyethylene film (unoriented) 50μ thick containing 3 wt% carbon black, 2 is paper 35μ thick and in a weight of 30 g/m² (no limitation on the tear strength), and 3 is a low density polyethylene adhesive layer the same as used in the packaging material of this invention shown in FIG. 2 (water content: less than 0.03 wt%, thickness: 15μ). The packaging material of this invention is illustrated in FIG. 2 of the drawings, and had the dimensions and composition as described above in the detailed description of the invention.

The characteristics in the example were evaluated by the following evaluation methods.
(1) Tear strength: JIS P-8116
(2) Tensile strength: JIS P-3113
(3) Heat seal strength: JIS Z-1707
(4) Lightproofness: The lightproofness against light of 80,000 lux was evaluated by the degree of fog formed on a highly sensitive film (for example, a photographic negative film for picture having an ASA sensitivity of 400).
(5) Bag openability: The bag openability was evaluated by easiness on tearing the bag and straightness of the opening part (Sensary test).
(6) Material total thickness: The thickness was measured with a micrometer according to JIS P-8118.

The results of the comparison are set forth in Table 1.

TABLE 1

| Properties | Conventional Packaging Material | | Packaging Material of this Invention | |
|---|---|---|---|---|
| Physical Strength | | | | |
| Tear Strength (g) (lengthwise) | C | (94) | B | (205) |
| Tear Strength (g) (crosswise) | B | (201) | A | (335) |
| Tensile Strength (kg/15 mm) (lengthwise) | D | (2.1) | B | (5.6) |
| Tensile Strength (kg/15 mm) (crosswise) | D | (2.1) | B | (4.2) |
| Heat Seal Strength (kg/15 mm) | C | (1.7) | B | (2.4) |
| Lightproofness | C | | B | |
| Bag Openability | C | | B | |
| Material Total Thickness (μ) | | (105) | | (95) |
| Manufacturing Cost Index | | (100) | | (80) |

Symbols:
A: excellent
B: good
C: practical
D: practical limit (i.e., minimal value which is still useful)

As is clear from Table 1, the packaging material of this invention has greater physical strength and lightproof property than the conventional packaging material, and a bag made of the packaging material of this invention can be more easily torn open than a bag made of the conventional packaging. The reduction in the thickness of the packaging material of this invention results in 20% lower manufacturing cost.

EXAMPLE 2

In the analogous arrangement for the layers as in Example 1 adhesive layers containing continuous longitudinal spaces wherein low density polyethylene was coated in the intervals of 10 mm, the width of 5 mm and the thickness of 30μ in place of conventional adhesive layer in Example 1 were applied by means of T die method. The results of the comparison are set forth in Table 2.

As is clear from Tables 1 and 2, the packaging material of this invention shown in Example 2 has almost the same physical strength and light-proof property as the packaging material of this invention shown in Example 1, but is far superior to the conventional packaging material. The reductions in the thickness of the packaging material and in the material for the adhesive layer in Example 2 result in a 30% lower manufacturing cost.

TABLE 2

| Properties | Conventional Packaging Material | | Packaging Material of this Invention | |
|---|---|---|---|---|
| Physical Strength | | | | |
| Tear Strength (g) (lengthwise) | C | (94) | B | (180) |
| Tear Strength (g) (crosswise) | B | (201) | A | (353) |
| Tensile Strength (kg/15 mm) (lengthwise) | D | (2.1) | B | (5.3) |
| Tensile Strength (kg/15 mm) (crosswise) | D | (2.1) | B | (3.6) |
| Heat Seal Strength (kg/15 mm) | C | (1.7) | B | (2.2) |
| Lightproofness | C | | B | |
| Bag Openability | C | | B | |
| Material Total Thickness (μ) | | (105) | | (105) |
| Manufacturing Cost Index | | (100) | | (70) |

Symbols:
A: excellent
B: good
C: practical
D: practical limit (i.e., minimal value which is still useful)

Figure 3:
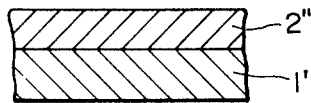
Figure 4:
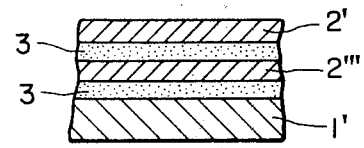

The packaging material of this invention has been described on the assumption that it uses the arrangement of layers shown in FIG. 2, but it should be understood that various modifications of the arrangement of layers are possible, two of which are represented schematically in FIGS. 3 and 4. The packaging material shown in FIG. 3 consists of a high density oriented polyethylene film 1' on one surface of which a layer of molten thermoplastic resin 2" is formed in a thickness larger than 13μ; and the packaging material shown in FIG. 4 is identical with the embodiment of FIG. 2 except that a moisture barrier is provided by an aluminium foil 2''' formed via an adhesive layer 3. Such arrangements are possible, provided that the flexible layer made of the thermoplastic resin layer 2" or paper 2' or aluminium foil 2''' formed on one surface of the thermoplastic oriented film 1' should have less tear strength than that of the oriented film 1' in the direction perpendicular to the axis of orientation of the film.

The layer to be formed on one surface of the oriented film 1' according to this invention can be a known flexible layer made of paper 2', thermoplastic resin layer 2" or any other suitable material such as a thermoplastic resin film laminated layer, cellophane, aluminium foil, cloth fabric, synthetic paper and nonwoven cloth. However, the flexible layers are not oriented in one direction. The "thermoplastic resin layer" described above refers to a flexible layer prepared by coating, but the "thermoplastic resin film laminated layer" described above refers to a flexible layer prepared by laminating films which were produced beforehand. The "synthetic paper" described above refers to a paper made of a synthetic polymer but not to a natural cellulose obtained from wood, etc. The oriented film 1' may be made of not only a high density polyethylene film but also a polypropylene film, a polystyrene film, a nylon film, a polyvinylidene chloride film, or a polyethylene terephthalate film, which film is oriented with respect to the longitudinal direction of the film at an angle of from 0° to 90°, preferably 0° or from 45° to 90°. The thickness of the oriented film 1' varies with the use, and it is desirably in the range of from 30 to 60$\mu$.

It is most preferred to draw the high density polyethylene in order to prepare the uniaxially oriented film. A drawing rate should be determined considering various characteristics such as physical strengths, a heat seal strength, an easiness for tearing, etc. When the drawing rate is 2.2 to 4.2 times, better result on above-mentioned characteristics are provided.

In the embodiments of FIGS. 2 to 4, the oriented film 1' contains a lightproof substance to make the film lightproof, but this substance may be incorporated in a flexible layer such as paper 2' or thermoplastic resin layer 2" or the adhesive layer 3.

The adhesive layer 3 is composed of, for example, known hot-melt type adhesives such as an ethylene-vinyl acetate copolymer type, a low molecular polyethylene type, a polyamide type, etc., or conventional adhesives in addition to a thermoplastic resin such as low density polyethylene, polypropylene, an ethylene-vinyl acetate copolymer resin, ionomer, an ethylene-ethyl acetate copolymer resin.

If desired, the adhesive layers which may comprise a net-like space where materials for adhesive layer are not coated on the film surface are prepared according to the process for extruding above-described materials for adhesive layer containing preferred foaming agents, for example, an inorganic foaming agent such as sodium hydrogencarbonate, etc., an organic foaming agent such as diazoamino benzene, etc., or water, with a coating apparatus such as is used for an extrusion coating method. For instance, when low density polyethylene resin is employed as the material for adhesive layer, 0.1 to 10% by weight of water is added to the material before melting the material and then the resulting material is applied according to such a method that the material is extrude-coated with known T die method. Furthermore, the adhesive layer having multiple continuous stripe-like spaces where materials for adhesive layer are not coated can be achieved by preparing opening portions and intercepted portions at desired intervals in the opening part of the T die, and extruding the material from the opening portion thereof; or by preparing continuous longitudinal or lateral grooves on the roll surface for coating adhesive layer and coating the layer therewith to apply continuous longitudinal stripe-like adhesive and space portion.

Examples of the lightproof substance include carbon black, metal powders such as aluminium, iron, magnesium, tin, zinc or alloys thereof, and pigments and coloring dyes such as barium sulfate, clay, kaolin, talc, calcium carbonate, titanium oxide, etc. The lightproof substance is incorporated in the packaging material preferably in an amount in the range of from 0.1 to 7 g/m$^2$, and more preferably from 1 to 5 g/m$^2$.

As described in the foregoing, the packaging material for photosensitive materials of this invention comprises a lamination of an oriented film, and a flexible film having a specified tear strength. The advantages of such packaging material are: it has high physical strength; a bag made of this packaging material is very easy to tear open, and provides a straight tear line; and the packaging material can be produced economically.

While the invention has been described in detail and with reference to specific embodiments thereof, it will be apparent to one skilled in the art that various changes and modifications can be made therein without departing from the spirit and scope thereof.

What is claimed is:

1. A packaging material for photosensitive materials which consists of a uniaxially oriented thermoplastic film oriented with respect to the longitudinal axis of the film at an angle of 45° to 89.9° and having formed thereon at least one flexible layer, which is not uniaxially oriented, having a tear strength less than that of the film in the direction perpendicular to the axis of orientation of the film.

2. A packaging material as in claim 1 wherein at least one of the oriented thermoplastic film or flexible layer contains a light shielding substance.

3. A packaging material as in claim 1 wherein said oriented film is selected from the group consisting of a high density polyethylene film, a polypropylene film, a polystyrene film, a nylon film, a polyvinylidene chloride film, and a polyethylene terephthalate film.

4. A packaging material as in claim 1 wherein said flexible layer is selected from the group consisting of paper, a thermoplastic resin layer, a thermoplastic resin film laminated layer, cellophane, aluminum foil, cloth fabric, synthetic paper and non woven cloth.

5. A packaging material as in claim 1, 2, 3, or 4 wherein the thickness of said oriented film is in the range of from 30 to 60$\mu$.

6. A packaging material as in claim 1 including an adhesive layer containing a light shielding substance.

7. A packaging material as in claim 2 or 6 wherein the light shielding substance is at least one of carbon black, metal powder, pigments, and coloring dyes.

8. A packaging material as in claim 7 wherein the light shielding substance is metal powder.

9. A packaging material as in claim 8 wherein said metal powder is selected from the group consisting of aluminum, iron, magnesium, tin, zinc, and alloys thereof.

10. A packaging material as in claim 2 or 6 wherein the light-shielding substance is incorporated in the packaging material in an amount in the range of from 0.1 to 7 g/m$^2$.

11. A packaging material as in claim 10 wherein the light-shielding material is incorporated in the packaging material in an amount in the range of from 1 to 5 g/m$^2$.

12. A packaging material as in claim 1 or 2 comprising an adhesive layer for adhering the uniaxially oriented thermoplastic film and flexible layer, said adhesive layer containing a net-like space.

13. A packaging material as in claim 1 or 2 comprising an adhesive layer for adhering the axially oriented thermoplastic film and flexible layer, said adhesive layer containing multiple continuous stripe-like spaces.

14. A packaging material as in claim 7 wherein the light shielding substance is a pigment.

15. A packaging material as in claim 14 wherein said pigment is selected from the group consisting of barium sulfate, clay, kaolin, talc, calcium carbonate and titanium oxide.

* * * * *